Patented Feb. 28, 1933

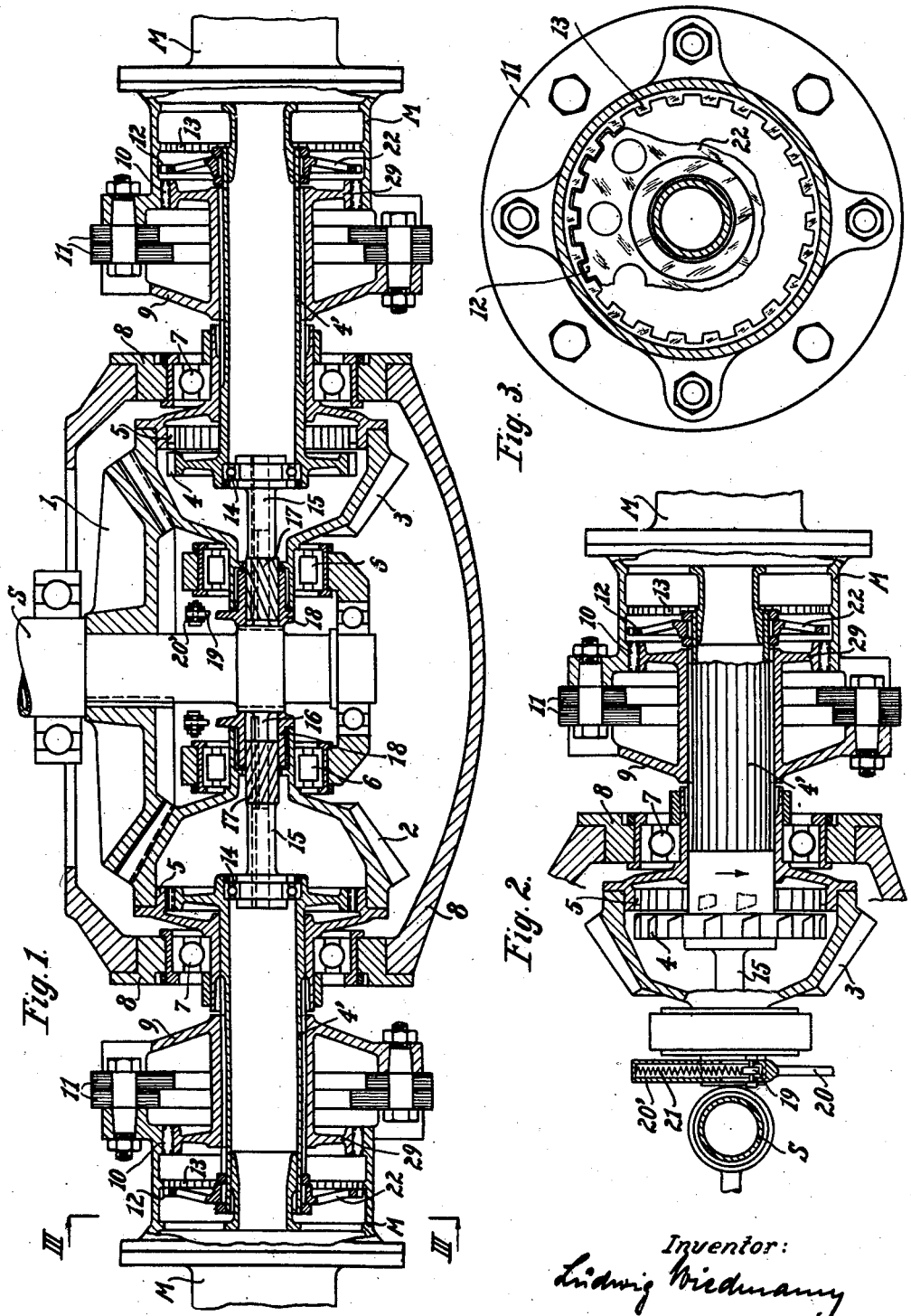

1,899,490

UNITED STATES PATENT OFFICE

LUDWIG WIEDMANN, OF FRIEDRICHSHAFEN, GERMANY, ASSIGNOR TO ZAHNRAD-FABRIK FRIEDRICHSHAFEN AKTIENGESELLSCHAFT, OF FRIEDRICHSHAFEN, GERMANY

MECHANISM FOR DRIVING PROPELLERS

Application filed April 2, 1932, Serial No. 602,846, and in Germany April 25, 1931.

My invention relates to mechanism for driving propellers especially in aircraft. It has special reference to devices of this kind in which two or more engines work on one propeller.

In power transmitting means for this purpose it is always difficult to disconnect a motor which stops out for some reason while the other motor goes on driving the propeller. It is necessary in such case to find the exact moment in which to declutch because at a moment later the idling motor is driven from the propeller shaft and disconnection of the claw coupling is impossible because of the claws being again under load.

According to my invention I provide means for automatically disconnecting the idling motor. By setting a certain member a spring is tensioned and this spring causes the disconnection at the moment when the coupling is not under load, prior declutching being prevented by adequate means.

This will be understood best by having reference to the drawing which represents an example embodying my invention.

Fig. 1 is a vertical longitudinal middle section through the whole mechanism. Fig. 2 is a corresponding horizontal section through the right hand half of the mechanism according to Fig. 1. And Fig. 3 is a vertical cross section along line III—III of Fig. 1 on an enlarged scale.

The propeller shaft is indicated at S. Rigidly connected thereto is bevelled gear 1 which meshes with bevelled gears 2 and 3.

The right hand and the left hand portions of the mechanism are substantially one like the other, so that the same numerals are applied to corresponding members. The driving shafts are indicated at M. The motors or engines belonging thereto are not shown. The right hand portion of Fig. 1 shows disconnection between driving shaft M and gear 3, whereas in the left hand portion driving connection between shaft M and gear 2 is represented.

Inside of bevelled gears 2 and 3, respectively, a claw coupling is situated which consists of outer teeth 5 in rigid connection with the respective gear and of inner teeth 4 forming part of hollow shaft 4'. Gears 2 and 3 are journaled in bearings 6 and 7 of the gear case 8. Splined to sleeve 4' is member 9, so that sleeve 4' can be shifted longitudinally within member 9. There is a flexible or resilient coupling 11 of any well known type inserted between member 9 and hollow shaft M. Besides member 9 is provided with a kind of claw coupling half 29 adapted to cooperate with internal teeth 10 of hollow shaft M, but these coupling teeth have so much play that they bear against each other only after shaft M and member 9 have made a certain torsional way relative to each other. Thus they serve only for limiting this way which is allowed for by the flexible coupling 11.

Furthermore there are internal teeth 13 on hollow shaft M, and a disc 22 fixed to shaft 4' has teeth 12. The teeth 13 and the teeth 12 are so positioned relative to each other that disc 22 is prevented from being shifted towards the middle of the whole mechanism as long as there is load on flexible coupling 11. But as soon as there is no load on this coupling the relative position of the teeth of both members is so that there is always a gap in one member opposite to a tooth of the other member and vice versa, as represented in Fig. 3. Consequently shaft 4' can now be shifted.

This shifting of shaft 4' might be effected by hand, but in the present example special means are provided for automatic operation. There is a bolt or shaft 15 one end of which is journaled in a bearing 14 within hollow shaft 4'. The other end is supported by means of bolt 16. This shaft 15 is practically a rotatable continuation of shaft 4'. The end supported by bolt 16 is threaded and surrounded by a fitting nut 18. This nut can be turned by means of lever 19. There is a rod 20 adapted to move lever 19 but having a forked end or cylinder 20' in which a spring 21 is situated, so that there is a kind of lost motion between members 20 and 19. Thus when rod 20 is moved lever 19 need not follow but only spring 21 is tensioned and lever 19 moves later under the action of spring 21 after certain resistances are removed.

The whole mechanism works as follows:

As long as the respective motor is working and connected to the propeller shaft the component parts are in the relative positions as indicated in the left hand portion of Fig. 1. Coupling 4/5 cannot be disconnected while the motor is driving because members 12 and 13 prevent such disconnection as long as flexible coupling 11 is under load.

If it is intended to disconnect the motor, rod 20 is moved to an adequate position (not represented) in which spring 21 is tensioned. Now the gas supply to the motor is turned off and the driving force is released. Consequently flexible coupling 11 for one moment is not under load and disc 22 gets into the position relative to shaft M in which teeth 12 fit into the gaps of teeth 13, thus allowing for hollow shaft 4' to be shifted so as to disconnect coupling 4/5. This shifting of shaft 4' is effected by means of tensioned spring 21 which causes lever 19 to turn nut 18, thereby unscrewing threaded portion 17 of bolt 15 pushing on shaft 4'.

Thus disconnection of the idling motor is caused automatically in the moment when there is no load on the couplings 11 and 4/5.

I do not want to be limited to the details described or shown in the drawing as many variations will occur to those skilled in the art.

What I claim is:

1. Mechanism of the type comprising a driving member and a driven member; a claw coupling between said members; and a resilient coupling between said members; means for disconnecting said claw coupling; means for preventing such disconnection while power is transmitted between said driving and said driven members, said latter means being in operative relation to said resilient coupling.

2. Mechanism as claimed in claim 1 further including means for tensioning said means for disconnecting said claw coupling.

3. Mechanism of the type comprising a driving member and a driven member; a claw coupling between said members; and a resilient coupling between said members; means for disconnecting said claw coupling; a toothed member in driving connection with one side of said resilient coupling, and another toothed member in driving connection with the other side of said resilient coupling, the teeth of said toothed members being so situated relative to each other that only in one certain position the teeth of the first member fit into the gaps between the teeth of the second member and vice versa.

4. Mechanism as claimed in claim 3 further characterized by the feature that said means for disconnecting said claw coupling are in operative connection with means for shifting said toothed members relative to each other.

5. Mechanism of the type comprising a driving member and a driven member; a claw coupling between said members; and a resilient coupling between said members; a toothed member in driving connection with one side of said resilient coupling, and another toothed member in driving connection with the other side of said resilient coupling, the teeth of said toothed members being so situated relative to each other that only in one certain position the teeth of the first member fit into the gaps between the teeth of the second member and vice versa; means for shifting said toothed members relative to each other; means for disconnecting said claw coupling; said latter two means being in operative connection.

6. Mechanism as claimed in claim 5 further including means for tensioning said means for disconnecting said claw coupling and said means for shifting said toothed members relative to each other.

LUDWIG WIEDMANN.